(12) United States Patent
Regnier et al.

(10) Patent No.: US 11,468,075 B1
(45) Date of Patent: Oct. 11, 2022

(54) SYSTEM AND METHOD FOR AUTOMATIC DATA VERIFICATION THROUGH CONCURRENT PROCESSING PATHS

(71) Applicant: Autodata Solutions, Inc., Troy, MI (US)

(72) Inventors: Joseph Regnier, London (CA); Andrew Keyes, London (CA)

(73) Assignee: Autodata Solutions, Inc., Troy, MI (US)

( * ) Notice: Subject to any disclaimer, the term of this patent is extended or adjusted under 35 U.S.C. 154(b) by 17 days.

(21) Appl. No.: 16/921,788

(22) Filed: Jul. 6, 2020

(51) Int. Cl.
| | |
|---|---|
| *G06F 16/24* | (2019.01) |
| *G06F 16/2458* | (2019.01) |
| *G06K 9/62* | (2022.01) |
| *G06N 20/10* | (2019.01) |
| *G06F 17/18* | (2006.01) |

(52) U.S. Cl.
CPC ...... *G06F 16/2462* (2019.01); *G06F 16/2465* (2019.01); *G06F 17/18* (2013.01); *G06K 9/6215* (2013.01); *G06N 20/10* (2019.01)

(58) Field of Classification Search
CPC .................. G06F 16/2462; G06F 16/2465
See application file for complete search history.

(56) References Cited

U.S. PATENT DOCUMENTS

| | | | | |
|---|---|---|---|---|
| 9,916,306 | B2 * | 3/2018 | van den Oever | ....... G06F 40/51 |
| 2012/0265518 | A1 * | 10/2012 | Lauder | .................... G06F 40/51 |
| | | | | 704/3 |
| 2014/0240120 | A1 * | 8/2014 | Mao | ........................ G08B 25/10 |
| | | | | 340/539.11 |
| 2020/0228551 | A1 * | 7/2020 | Dalal | .................. H04L 63/1425 |

* cited by examiner

*Primary Examiner* — Baoquoc N To
(74) *Attorney, Agent, or Firm* — Rutan & Tucker, LLP

(57) ABSTRACT

A data analytic system for conducting automated analytics of content within a network-based system. The data analytic system features query management logic that, responsive to a triggering event, initiates queries for retrieval of particular type of content to be verified. The data analytic system further features multi-stage statistical analysis logic, automated intelligence and reporting logic. The statistical analysis logic is configured to concurrently conduct a plurality of statistical analyses on the content and generate corresponding plurality of statistical results, apply weightings to each of the statistical results, perform arithmetic operation(s) on the weighted statistical results to produce an analytic result, and determine whether the analytic result signifies that the content constitutes errored content. The reporting logic generates one or more issue alert messages including information for rendering a dashboard representing the analyses conducted by the multi-stage statistical analysis logic and the automated intelligence.

11 Claims, 10 Drawing Sheets

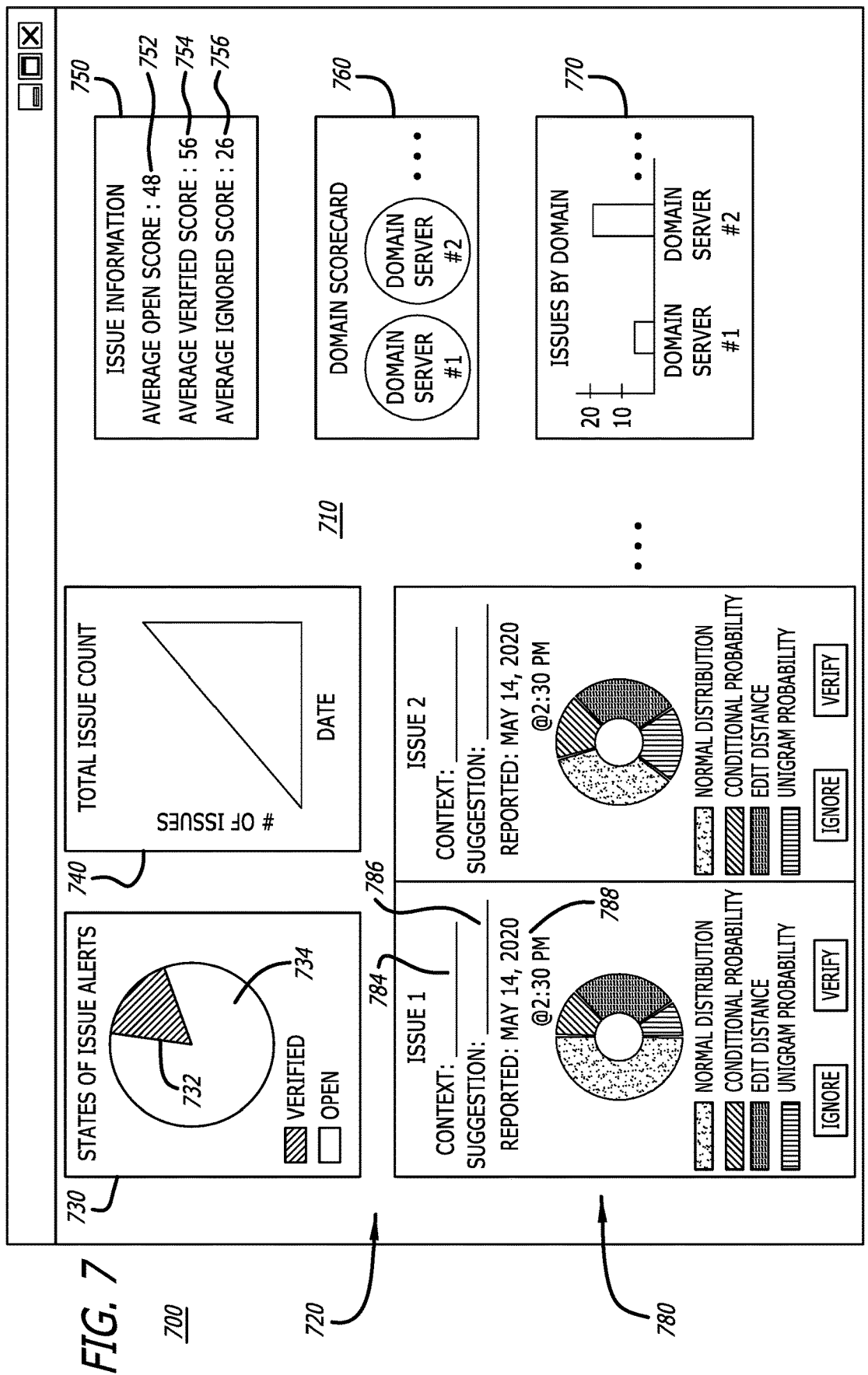

US 11,468,075 B1

SYSTEM AND METHOD FOR AUTOMATIC DATA VERIFICATION THROUGH CONCURRENT PROCESSING PATHS

FIELD

Embodiments of the disclosure relate to the field of networking. More specifically, one embodiment of the disclosure relates to a software framework configured to verify the accuracy of data through the use of concurrent statistical modules along with machine learning system based analytics.

GENERAL BACKGROUND

For decades, companies have provided data feeds to a group of individuals who are responsible for visually inspecting the content of these data feeds and controlling the distribution of content associated with these data feeds to one or more targeted destinations. As an illustrative example, an automotive company may provide this group of individuals with numerous data feeds, which includes content for use in an advertisement campaign or content relied upon by dealerships to entice potential customers to purchase their vehicles, such as inventory notices, price incentives, or catalog information (e.g., description of equipment within a vehicle). Prior to dissemination of the content associated with any data feed to a targeted destination (e.g., dealership(s), advertisement agency, public at large, etc.), the group of individuals is tasked to inspect the accuracy of this content. Given the content merely undergoes a visual inspection, in some situations, content with entry errors (hereinafter, "errored content") is released to the general public. In some situations, the errored content may cause severe financial and legal liabilities.

For instance, the data feed may be directed to an incentive offered by an automotive company such as a $1,500 cash back offer. Where the data feed mistakenly identifies that the automotive company is offering a $15,000 cash back and this error is not caught by visual inspection, the dealership would be required to honor the $15,000 cash back to those persons relying on that offer. Besides visual inspection being an inherently unreliable review process, this conventional inspection process fails to provide a reliable secondary process that takes into account historical tendencies of incentives offered by the automotive company to more accurately and consistently verify errored content while avoiding a high-rate of false negatives (i.e., detected accurate content that is subsequently determined to be errored content) and/or rate of false positive (i.e., detected errored content when the content is accurate).

BRIEF DESCRIPTION OF THE DRAWINGS

Embodiments of the invention are illustrated by way of example and not by way of limitation in the figures of the accompanying drawings, in which like references indicate similar elements and in which:

FIG. 7 is an exemplary embodiment of a dashboard for an administrator configured to receive issue alert messages from the data analytic system of FIG. 1 and FIGS. 3-4.

DETAILED DESCRIPTION

Figure 1:
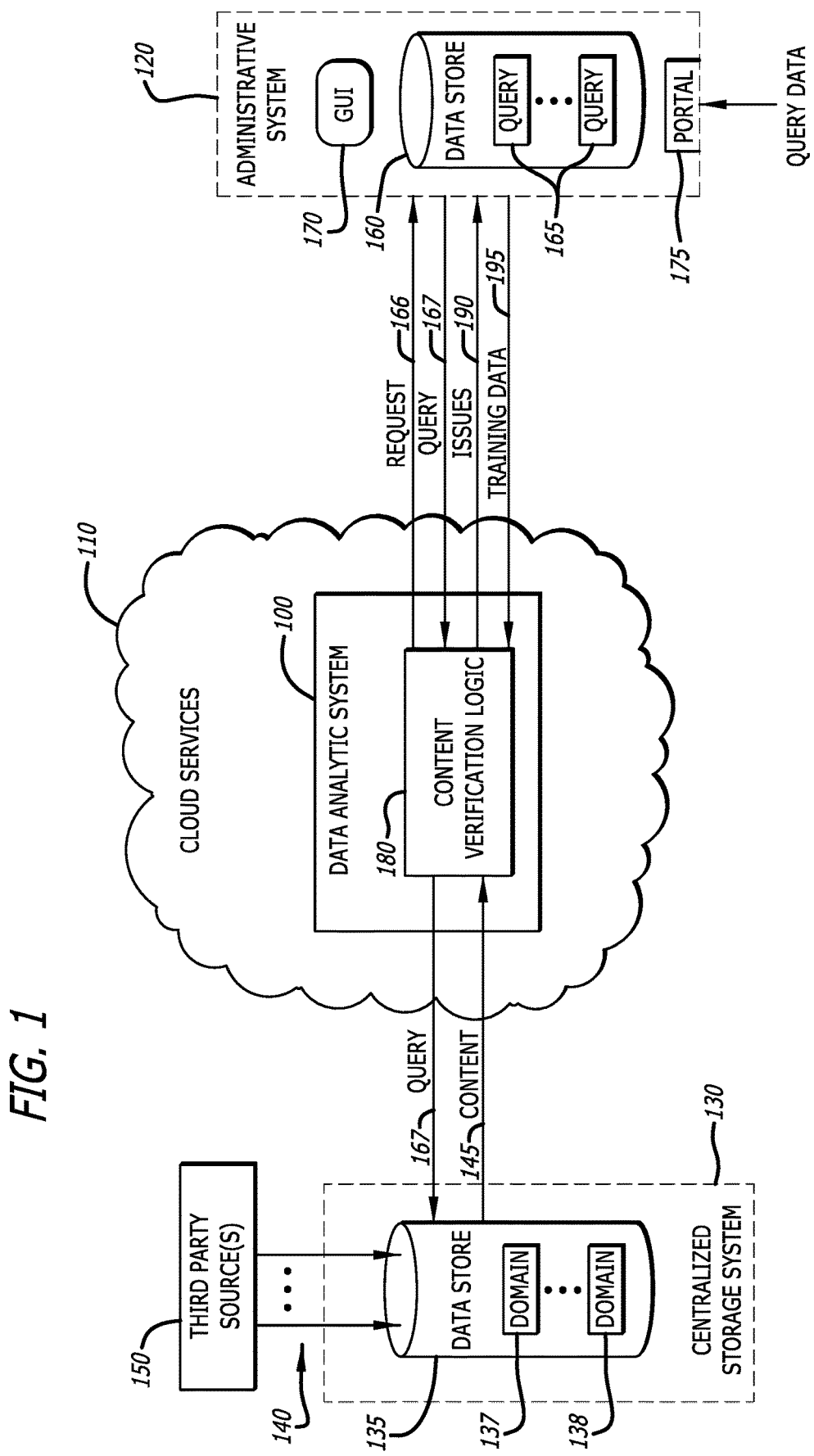
FIG. 1 is a block diagram of an exemplary embodiment of cloud-based data analytic subsystem including content verification logic.

Embodiments of the present disclosure generally relate to a data analytic system that is configured to identify the accuracy of content included as part of a collection of data (hereinafter, "dataset") processed by or partially propagated through the data analytic system. Herein, the content may include alphanumeric characters, symbols, images, video clips, or any combination thereof. As an illustrative embodiment, with respect to automotive-related data, the content may include data directed to inventory, incentives, and/or catalog information (e.g., data associated with available vehicles). Besides the content, the dataset may further include metadata associated with the content such as context information (e.g., content description in alphanumeric applicable characters, timestamp to denote download time, one or more domain servers being the source of the content, etc.) or analytic control information being information relied upon for analytics conducted on the content (e.g., weightings, selected statistical analyses, threshold for use in identifying errored content, etc.). The dataset may be a collection of data gathered from one or more data stores, where such as data stores may be located at different systems, as described below.

Herein, according to one embodiment of the disclosure, the data analytic system is provided access to the content and evaluates the accuracy of the content through concurrent (statistical) analyses followed by analytics conducted on the results of these concurrent analyses by automated intelligence. Herein, the type of analyses performed on the content of the dataset may be determined based a type of query initiated by the data analytic system in retrieval of the content. For example, the analyses may include different types of statistical analyses, which may include, but are not limited or restricted to the following: Edit Distance, Normal Distribution (Standard Deviation), Unigram Probability, and/or Conditional Probability. For instance, with respect to incentives (e.g., cash back, vehicle financing, etc.), Edit Distance, Normal Distribution and Conditional Probability may be selected as these statistical analyses more applicable in determining whether content associated with an incentive (e.g., cash back amount, percentage rate of the financing, term, etc.) is accurately portrayed in the content. These multiple, statistical analyses are conducted concurrently (e.g., operating at least partially at the same time) to produce statistical results, which are provided to the automated intelligence.

According to one embodiment of the disclosure, the automated intelligence may include a machine learning system module such as an artificial neural network module, a support vector machine, or another type of artificial intelligence for example. Herein, the support vector machine may be employed as an alternative embodiment deployed as a supervised machine learning classifier for purposes of simplifying models. The support vector machine removes likelihood of exhaustive training leading to overfit statistical models, increasing difficulties to justify determinations. Given increased training inputs and parameters, a shift to artificial neural network may be favored for performance and reducing engineering efforts.

According to one embodiment of the disclosure, the automated intelligence applies weightings, which may be provided as part of the dataset, to each of the statistical results and performs an arithmetic operation (e.g., summation or other aggregation scheme, etc.) on the weighted statistical results to produce a final result referred to as the "analytic result." Herein, the selected weighting between each of the statistical results may be based, at least in part, on the query type (e.g., the type of data being verified). For instance, any weighting associated with results produced from an "incentive" query may be significantly reduced or disregarded completed (e.g., zero weighting) for certain statistical analyses modules (e.g., Unigram Probability) while the weightings associated with other statistical analyses, such as Edit Distance or Normal Distribution for example, may be increased. This "tuning" of the weightings may be accomplished from training data, which may be returned to the automated intelligence based on correct/incorrect determinations of errored content based on analytic results (e.g., when the query ID and weightings are locally stored and local weightings are applied) and provided to a data store with an administrative system to provide the most current weighting for each type of query.

Responsive to the content under evaluation being determined to be inaccurate (i.e. "errored" content") as determined from the automated intelligence, the data analytic system generates an issue alert message (hereinafter, "issue alert"), which is made available to a graphic user interface (GUI) associated with a network device controlled by an analyst or other administrator. The issue alert may include an inaccuracy index identifying the likelihood of the content being "errored" content (e.g., values representing the analytic results and/or statistical results to assist in identifying the statistical analysis that was most effective in detecting the errored content). Besides an inaccuracy index, the issue alert may further include (i) an identifier associated with the query, (ii) context information associated with the content under analysis (e.g., description of the content, timestamp, etc.), (iii) suggested content (produced by the suggestion generation logic), or the like. The information included within the issue alert may be rendered by the GUI and, after confirmation of the accuracy or inaccuracy of the issue alerts, training data to alter operability of the automated intelligence and/or statistical analyses may be provided.

More specifically, according to one embodiment of the disclosure, the data analytic system features query management logic, multi-stage statistical analysis logic, suggestion generation logic, automated intelligence including analytic result computation logic and threshold assessment logic, and reporting logic. Herein, responsive to a triggering event (e.g., a scheduled analysis time, detection of a newly received dataset into a monitored data store, manual request, etc.), the query management logic retrieves one or more queries from an administrative system, where the one or more queries (generally referred to as "query") is selected based on the particular type of content to be verified. Assigned an identifier (ID), the query provides a framework for the data to be retrieved from one or more domain servers deployed within a centralized storage system, as described below.

As an illustrative example, where the content is associated with an incentive, the content may be provided to at least a particular domain server allocated to maintain incentive-based information. Similarly, where the content is associated with "catalog" (equipment-based) information, the content may be provided to at least a particular domain server allocated to maintain "catalog" based content (e.g., description of vehicle options, etc.). Hence, based on the particular domain server that receives the newly stored content, the query management logic retrieves a query, which is registered as part of a management system, for use in verification the accuracy of the received content.

Herein, the query management logic provides a data set, namely a collection of information received from the administrative system (e.g., content, context information, etc.) and the centralized storage system, to the multi-stage statistical analysis logic for processing in accordance with multiple processing threads. Herein, the multi-stage statistical analysis logic includes a plurality of statistical modules, each statistical module is directed to a different type of statistical analysis in accordance with natural language processing, such as Edit Distance, Normal Distribution (Standard Deviation), Unigram Probability, and/or Conditional Probability, as described below. According to one embodiment of the disclosure, based on information with the dataset, the multi-stage statistical analysis logic may be configured to select which statistical module(s) are to receive and analyze content included as part of a dataset. The statistical analyses are performed concurrent on this content to produce multiple statistical results identifying whether particular natural pro. Thereafter, each of the statistical results produced by the selected statistical modules identifies whether the content constitutes "errored" content and provides the statistical results to the automated intelligence.

For instance, with respect to an incentive under analysis (e.g., cash back, vehicle financing), statistical modules directed to Edit Distance, Normal Distribution and Conditional Probability may be selected for conducting concurrent analyses on content associated with the incentive (e.g., cash back amount, percentage rate of the financing, term, etc.) to determine whether the content may constitute "errored" content (e.g., content includes errors that are of a prescribed significance to preclude dissemination of the content). With respect to accuracy of text strings being part of the dataset, statistical modules directed to Edit Distance and Unigram Probability may be selected to generate statistical results that more accurately represent whether the content associated with the dataset poses an issue (e.g., content is errored content).

It is contemplated that, in lieu the statistical modules being selected based on weightings provided as part of the dataset, it is contemplated that the content associated with the incentive may be provided as input to each of the statistical modules, where lesser applicable statistical modules for analysis of the particular dataset are rendered less influential in a determination whether the content constitutes errored content by applying a lesser weighting to the statistical result produced by those lesser applicable statistical modules.

According to one embodiment of the disclosure, the automated intelligence applies a weighting to each of the statistical results received by the multi-stage statistical analysis logic and aggregates the statistical results to produce an analytic result. Herein, the selected weighting between each of the statistical results may be based, at least in part, on the type of query relied upon for retrieval of the content from the centralized storage system. Also, the analytic result may be represented by a score or other value for subsequent comparison with a threshold value. The threshold value may be set in accordance with query type, depending on risk tolerance levels for a company relying on the distribution of the content.

Responsive to the threshold assessment logic detecting that the analytic result has exceeded the threshold value, which suggests the content under evaluation constitutes errored content, the threshold assessment logic forwards at least the query ID, the weighted (or unweighted) statistical results along with context information included as part of the dataset to a reporting logic. The reporting logic is configured to generate an issue alert, which is made available to a graphic user interface (GUI) associated with a network device controlled by an analyst or other administrator.

According to one embodiment of the disclosure, the issue alert may include an inaccuracy index along with the query ID and context information, as described above. The data included within the issue alert may be rendered by the GUI to produce a dashboard, which allows for selective confirmation of the accuracy or inaccuracy of the issue alerts. Portions of the results deemed to be "inaccurate" and "accurate" may be used as training data for the automated intelligence.

I. Terminology

In the following description, certain terminology is used to describe aspects of the invention. In certain situations, the terms "logic" (or system) are representative of hardware, firmware, and/or software that is configured to perform one or more functions. As hardware, the logic (or system) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or system) may be software in the form of one or more software modules. Each software module may include an executable application, a daemon application, an application programming interface (API), a subroutine, a function, a procedure, a process, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. A "data store" may be any type of data storage logic such as the non-transitory storage medium (described above) or a logical storage such as cloud-base storage that is supported by one or more physical storage devices.

The term "computerized" generally represents that any corresponding operations are conducted by hardware in combination with software and/or firmware.

A first statistical module, referred to as "Edit Distance," when executed, generates a process that is configured to quantify dissimilarities between two different datasets by determining a minimum number of operations required to transform one dataset into the other. According to one embodiment, the Edit Distance process may be used to identify one or more content errors (e.g., insertion of an additional character or symbol, omission of one or more characters or symbols, etc.), where the content error(s) significantly change the meaning of the data set.

A second statistical module, referred to as "Normal Distribution," when executed, generates a process that is configured to determine whether the content in inaccurate (e.g., the amount of variation or dispersion between the suspected content in error and the expected content. The expected content may include, but is not limited or restricted to a mean value based on historical data. Hence, the Normal Distribution can identify errors in the content, such as an additional character has significantly changed the intended value by the current value falling outside one or more standard deviations from the mean.

A third statistical module, referred to as "Unigram Probability," when executed, generates a process that is configured to determine whether content (e.g., a character string or other sequence of data) appears to misplaced in relation with previously content in the dataset. Hence, Unigram Probability is more applicable toward analysis of text (e.g., vehicle descriptions, etc.) or datasets that are based on a prescribed data structure.

A fourth statistical module, referred to as "Conditional Probability," when executed, generates a process that is configured to determine the probability of content error based upon a presence (or absence) of content within the data set given that other content is present (or absent) from the dataset. For instance, the conditional probability may be applicable when the content is directed to two different events, when such events are normally mutually exclusive. As an illustrative example, the content may be construed as including content errors when a cash back offer AND a lower finance offer are provided by an incentive-based data set, when most incentives offer a cash back OR low financing.

The term "network device" should be generally construed as physical or virtualized device with data processing capability and/or a capability of connecting to any type of network, such as a public cloud network, a private cloud network, or any other network type. Examples of a network device may include, but are not limited or restricted to, the following: a server, a router or other intermediary communication device, an endpoint (e.g., a laptop, a smartphone, a tablet, a desktop computer, a netbook, IoT device, industrial controller, etc.) or virtualized devices being software with the functionality of the network device.

The term "message" generally refers to as information placed in a prescribed format that is transmitted in accordance with a suitable delivery protocol or accessible through a logical data structure such as an Application Programming Interface (API). Examples of delivery protocols may include, but are not limited or restricted to HTTP (Hypertext Transfer Protocol); HTTPS (HTTP Secure); Simple Mail Transfer Protocol (SMTP); File Transfer Protocol (FTP); iMES SAGE; Instant Message Access Protocol (IMAP); or the like. The message may be provided as one or more packets, frames, or any other series of bits having the prescribed, structured format.

In certain instances, the terms "compare," "comparing," "comparison," or other tenses thereof generally mean determining if a match (e.g., identical or a prescribed level of correlation) is achieved between meta-information associated with two items under analysis.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." Similarly, the term "etc." denotes this "and/or" relationship. An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Data Analytic System Deployments

Referring to FIG. 1, a block diagram of an exemplary embodiment of data analytic system 100 operating as a service within a cloud network 110 (e.g., public or private cloud network) is shown. Herein, the data analytic system 100 is configured for communications with an administrative system 120 and a centralized storage system 130. The centralized storage system 130 is adapted with circuitry (not shown) and a data store 135 to receive a collection of data 140 (hereinafter, "data feed") provided from one or more third party sources 150. Each data feed 140 may include content 145 that is requested from the data analytic system 100 and gathered from different portions of the data feed 140 or even different data feeds. The content 145 is provided to the data analytic system 100 to be verified prior to dissemination to one or more destinations. For example, where one of the third party sources 150 is an automotive company or dealership, the content 145 may include vehicle inventory data, incentive data, data associated with vehicle equipment, or the like. Other types of third party sources 150 may include customers, trade associations or the like provide data to the centralized storage system 130 (e.g., Twitter® feeds, reviews or summaries, etc.).

The administrative system 120 includes a data store 160 and a graphic user interface (GUI) 170, both of which may be accessed and/or controlled by circuitry (not shown). The data store 160 is configure to maintain a plurality of queries 165 according to each third party source. In particular, after completion of a registration process with the administrative system 120, an administrator for any of the third party sources 150 may gain access to logic operating within the administrative system 120 through a portal 175. Upon successful authentication, the administrator may generate queries 165 that are used to initiate dataset retrieval and provide control parameters for use in the verification of the dataset 145 provided by the third party source 150. Upon generation, each of the queries is configured to include at least (i) an identifier 210 (e.g., query ID) and (ii) a value 220, as shown in FIG. 2.

Figure 2:
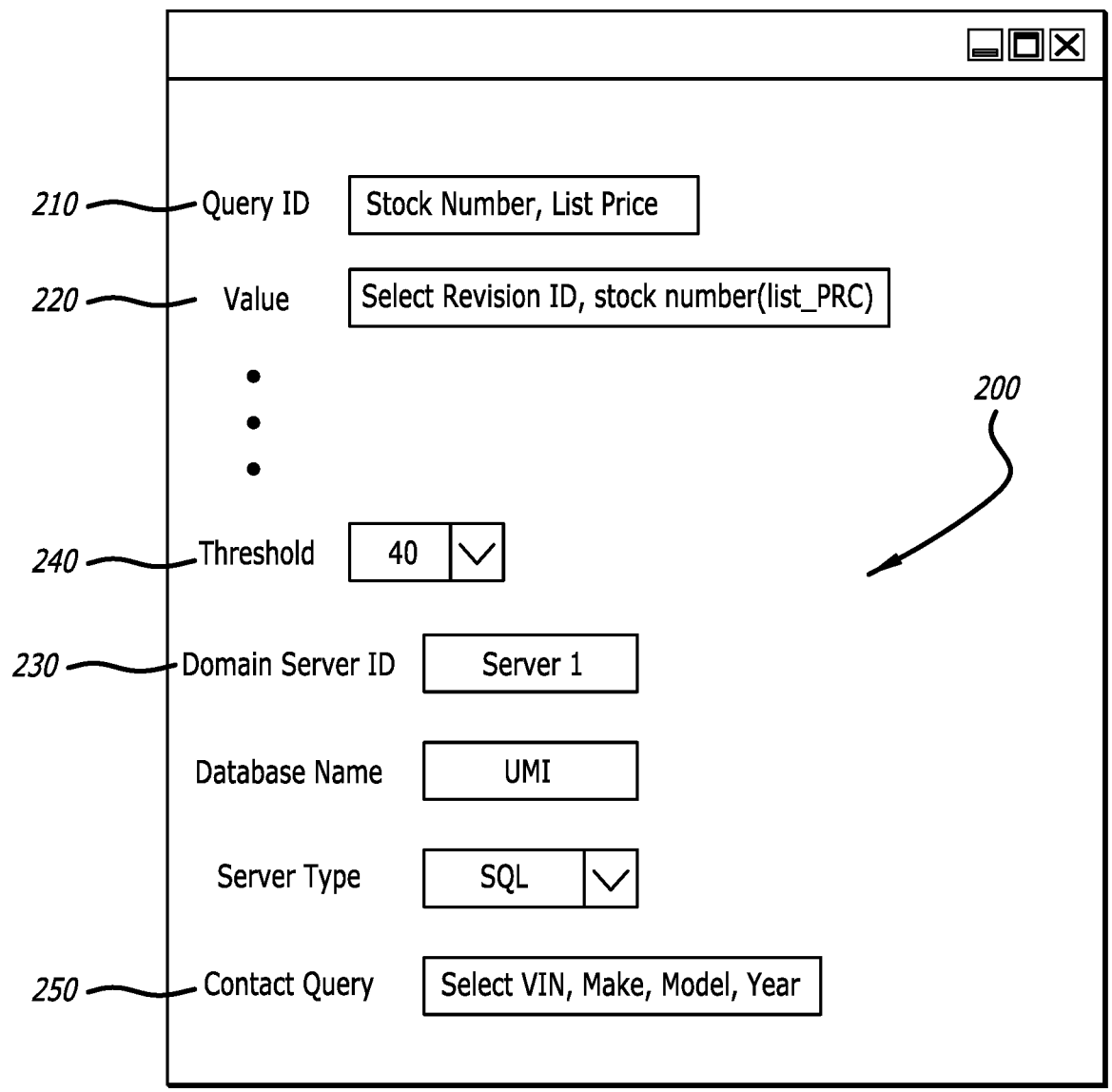
FIG. 2 is an exemplary embodiment of a query formation window displayed by a graphic user interface of an administrative system in communications with the data analytic system for registration of a query.

More specifically, as shown in FIG. 2, an exemplary embodiment of a query formation window 200 displayed by the GUI 170 of the administrative system 120 in communications with the data analytic system 100 of FIG. 1 is shown. Herein, the query formation window 200 enables an administrator to generate a query for analysis of content from a source. Herein, the query formation window 200 includes the identifier 210, the value 220, and additional metadata to accompany the content associated with the value, such as domain server identifier 230, a threshold value 240, and context (query) information 250.

Herein, as shown in FIG. 2, the identifier 210 constitutes information to identify a storage location (e.g., particular domain server, or particular storage area, etc.) from which the dataset is to be retrieved. The value 220 identifies the content associated with the submitted record to be retrieved from the centralized storage system 130 for verification (e.g., type of data to be extract from one or more records). Additionally, the domain server identifier 230 identifies a location within the data store 135 for accessing the record or records. The threshold value 240 identifies the threshold utilized by the automated intelligence within the content verification logic 180 (described below) for determining a presence of errored content. The context information 250 constitutes the information that may be used to describe or identify the content. For instance, with respect to a query where the data analytic system 100 supports automotive-based queries for example, the context information 250 may include, but is not limited or restricted to the following: a vehicle identification number (VIN), make, model, and/or year of the vehicle.

Returning back to FIG. 1, the cloud network 110 (e.g., a public cloud network such as Microsoft Azure®, or Amazon Web Services®, or Google Cloud®, etc.) is a fully virtualized, multi-tenant cloud service made available through one or more data centers, namely a plurality of servers maintained by a provider of the cloud network 110 providing cloud services including the content verification logic 180. As an illustrative example, the cloud verification logic 180 may be maintained with cloud-based storage (e.g., non-transitory storage medium represented as a storage instance such one or more S3 storage instances within Amazon Web Services®, etc.) and processed by processor (e.g., a virtual processor as one or more processor-based instances such as EC2 instances within Amazon Web Services®, etc.).

Responsive to a triggering event (e.g., a scheduled analysis time, detection of a newly received dataset into the monitored data store 135, manual selection, etc.), the content verification logic 180 deployed within the data analytic system 100 retrieves one or more queries from the administrative system 120, where the quer(ies) are selected based on the particular type of content awaiting verification. As an illustrative example, where the content 145 is associated with an incentive offered by the third party source 150 for example, upon detection of the triggering event, the data analytic system 100 issues a request 166 for a query 167

(e.g., at least a subset of the stored queries 165) directed to incentives associated with that third party source 150 (or a general incentive query). Upon receiving the query 167, the content verification logic 180 may provide the query 167 to the centralized storage system 130. The query 167 may be directed to a particular domain server 137 within the data store 135 allocated to maintain "incentive" based content for that particular third party source. Similarly, where the content is associated with vehicle equipment data, the query 167 may be provided to a particular domain server 138 allocated to maintain "vehicle equipment" content (e.g., description of vehicle options and installed equipment, etc.). Based on the query 167, the centralized storage system 130 provide the suitable content 145 to the content verification logic 180. The content 145, along with information from the query 167 received from the administrative system 120 (e.g., threshold, weighting, query ID, etc.) collectively form a dataset 155 (see FIG. 5) that is processed within the content verification logic 180.

The content verification logic 180 may be configured to perform analytics on the dataset 15 to determine a presence of errored content. Based on this determination, the data analytic system 100 may generate one or more issue alert messages 190 (hereinafter, "issue alert(s)") to one or more administrators via the administrative system 120. The issue alert(s) 190 may include the query ID, statistical results conducted by various statistical analysis modules, query identifier, context information, which may be rendered for display on a dashboard (see FIG. 7) for evaluation by an administrator. It is contemplated that the generation of issue alert(s) 190 may encompass or signal the administrators that the analytic results associated with the dataset 15 are accessible. Therefrom, training data 195 may be returned to automated intelligence within the content verification logic 180 to improve performance and accuracy of the analytic results generated therefrom.

Although not shown in FIG. 1, the data analytic system 100 may be configured to aggregate content associated with the analytic results to generate one or more issue alert(s) 190 to be rendered on a single display (dashboard) to visually illustrate the presence of any potential errored content within the data feed 140. The dashboard may provide additional verification of suspected errored content within a dataset by one or more physical or virtual analysts to confirm that the dataset 167 requires further modification before dissemination to the one or more destinations.

Figure 3:
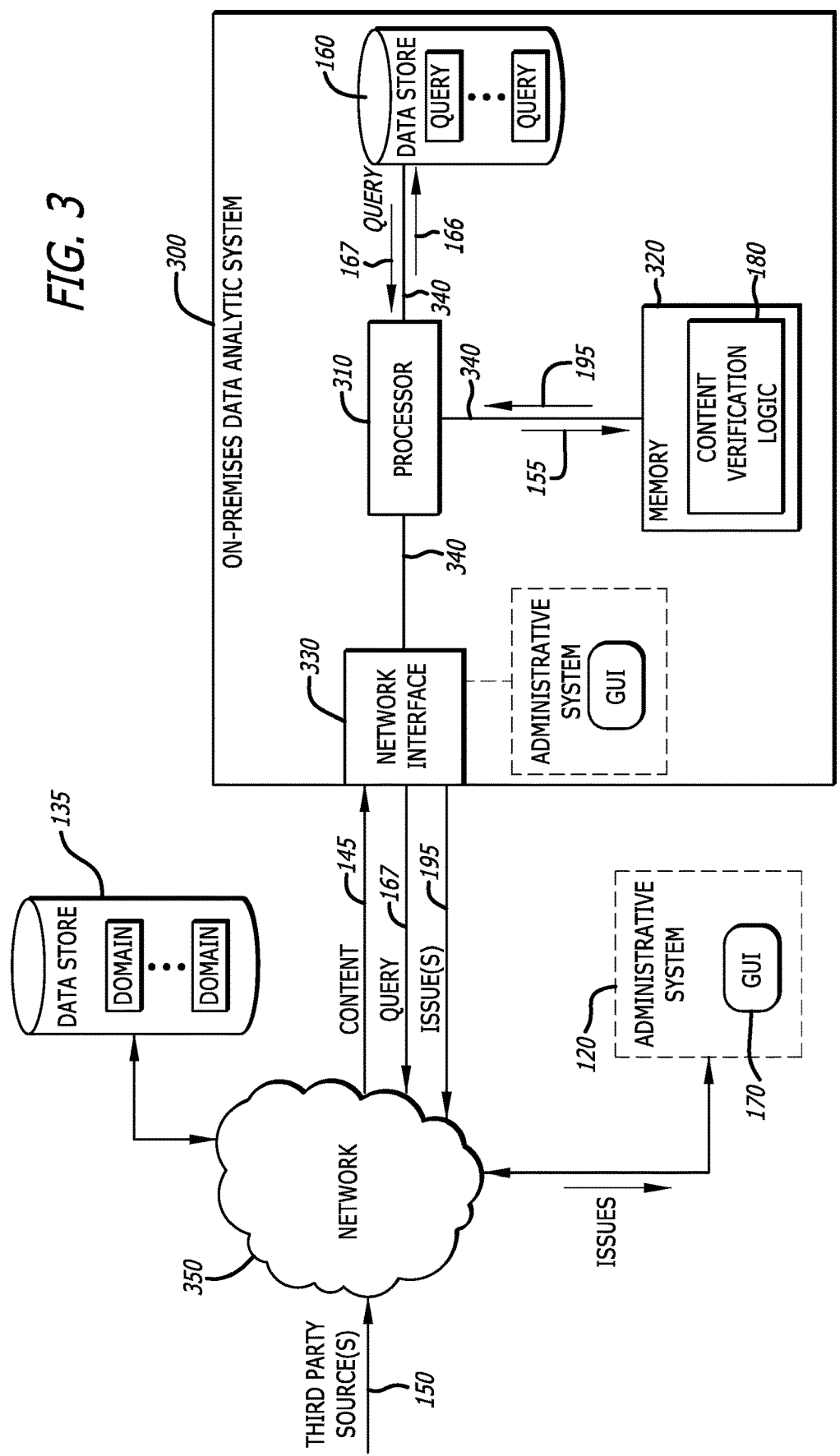
FIG. 3 is a block diagram of an exemplary embodiment of an on-premises data analytic subsystem including the content verification logic of FIG. 1.

Referring to FIG. 3, an exemplary embodiment of a hosted service (on-premises) deployment for the data analytic system 100, which is installed within an on-premises network device 300 is shown. The network device 300 may include a processor (e.g., hardware processor) 310, a non-transitory storage medium (e.g., memory) 320 and a network interface 330, which are communicatively coupled together via one or more transmission mediums 340, for establishing and maintaining communications over a network 350. The operability of the data analytic system 100 is similar to those operations described above and illustrated FIG. 1, where the content verification logic 180 receives the dataset 155 based on the query 167 and outputs the issue alert 195. Herein, the GUI 170 and/or the operability of the administrative system 120 may be deployed within the on-premises network device 300 or external therefrom, as shown by dashed lines to represent the optional nature of such logic.

Figure 4:
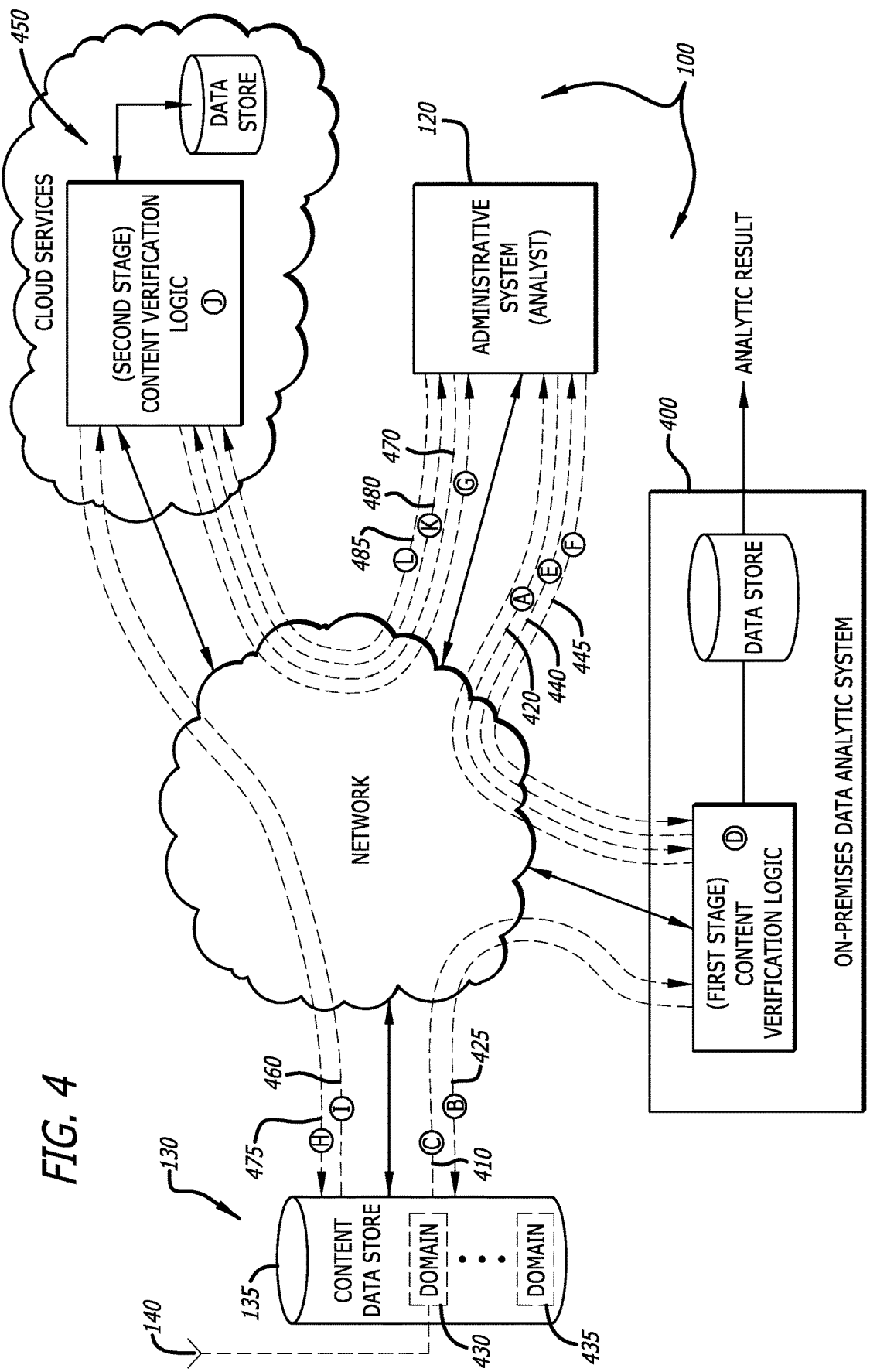
FIG. 4 is a block diagram of an exemplary embodiment of a hybrid deployment of the data analytic system featuring an on-premises data analytic subsystem that includes first content verification logic configured to verify the accuracy of a certain type or types of data and a cloud-based data analytic subsystem including second content verification logic configured to verify the accuracy of another type or types of data.

Referring now to FIG. 4, an exemplary embodiment of a hybrid data analytic system 100 including a first stage of the data analytic system 100 (hereinafter, "first data analytic stage 400") and a second stage of the data analytic system 100 (hereinafter, "second data analytic stage 450") is shown. Herein, the first data analytic stage 400 may be configured to conduct a verification of a first type of content 410 (e.g., confidential or highly sensitive content) while the second data analytic stage 450 may be configured to conduct a verification of other types of content 460.

Responsive to a triggering event, the first data analytic stage 400 retrieves at least one query 420 from the administrative system 120, where the query 420 may be selected based on the particular type of content that is awaiting verification, such as content 410 for example (operation A). As an illustrative example, access to different domain servers 430 may be scheduled in which the content 410, being part of the data feed 140, is verified for accuracy. As shown, the first data analytic stage 400 may provide a query 425 (e.g., including content from at least a portion of the query 420) to the centralized storage system 130 (operation B). The query 425 may be directed to retrieve the specific dataset 410 from a particular domain server 435 of the domain servers 430, maintained within the data store 135 of the centralized storage system 130.

Based on the query 425, the centralized storage system 130 provide the content 410 to the first data analytic stage 400 (operation C). After receipt of the content 410, the first data analytic stage 400 provides content 410 along with information from the query 420 (e.g., threshold, context information, etc.) for processing as a dataset by the content verification logic within the first data analytic stage 400. More specifically, the first data analytic stage 400 may be configured to perform analytics on the collected content 410 to determine a presence of errors (operation D). Based on this determination, the first data analytic stage 400 may generate one or more issue alert(s) 440 to the administrative system 120 (operation E). The issue alert(s) 440 may include the statistical results conducted by various statistical analysis modules deployed within the first data analytic stage 400, query ID, context information (e.g. description of content, timestamp, suggestion, etc.) or other information, which may be rendered for display on a dashboard (see FIG. 7) for evaluation by an administrator. It is contemplated that the generation of issue alert(s) 440 may encompass or signal the administrators that the analytic results associated with the dataset 410 are accessible. Therefrom, the training data 445 may be returned to the first data analytic stage 400 to improve performance and accuracy of the analytic results generated therefrom (operation F).

Similar to the operability of the first data analytic stage 400, the second data analytic stage 460 is configured to retrieve at least one query 470 from the administrative system 120, where the query 470 may be selected based on the particular type of content that is awaiting verification, such as the content 460 for example (operation G). As shown, the second data analytic stage 450 may provide a query 475 (e.g., including content from at least a portion of the query 470) to the centralized storage system 130 (operation H). The query 475 may be directed to retrieve the specific dataset 460 from a particular domain server of the domain servers 430, maintained within the data store 135.

Based on the query 470, the centralized storage system 130 provides the content 460 to the second data analytic stage 450 (operation I). After receipt of the content 460, the second data analytic stage 450 provides a dataset, inclusive of at least a portion of the content 460 and information from the query 470 (e.g., threshold, weightings, etc.) for processing by the second data analytic stage 450. More specifically, the second data analytic stage 450 may be configured to perform analytics on the dataset to determine a presence of errored content (operation J). Based on this determination, the second data analytic stage 400 may generate one or more issue alert(s) 480 to the administrative system 120 (operation K). Also, training data 485 may be returned to the second data analytic stage 450 to improve performance and accuracy of the analytic results generated therefrom (operation L).

III. Content Verification Logic Architecture

Figure 5:
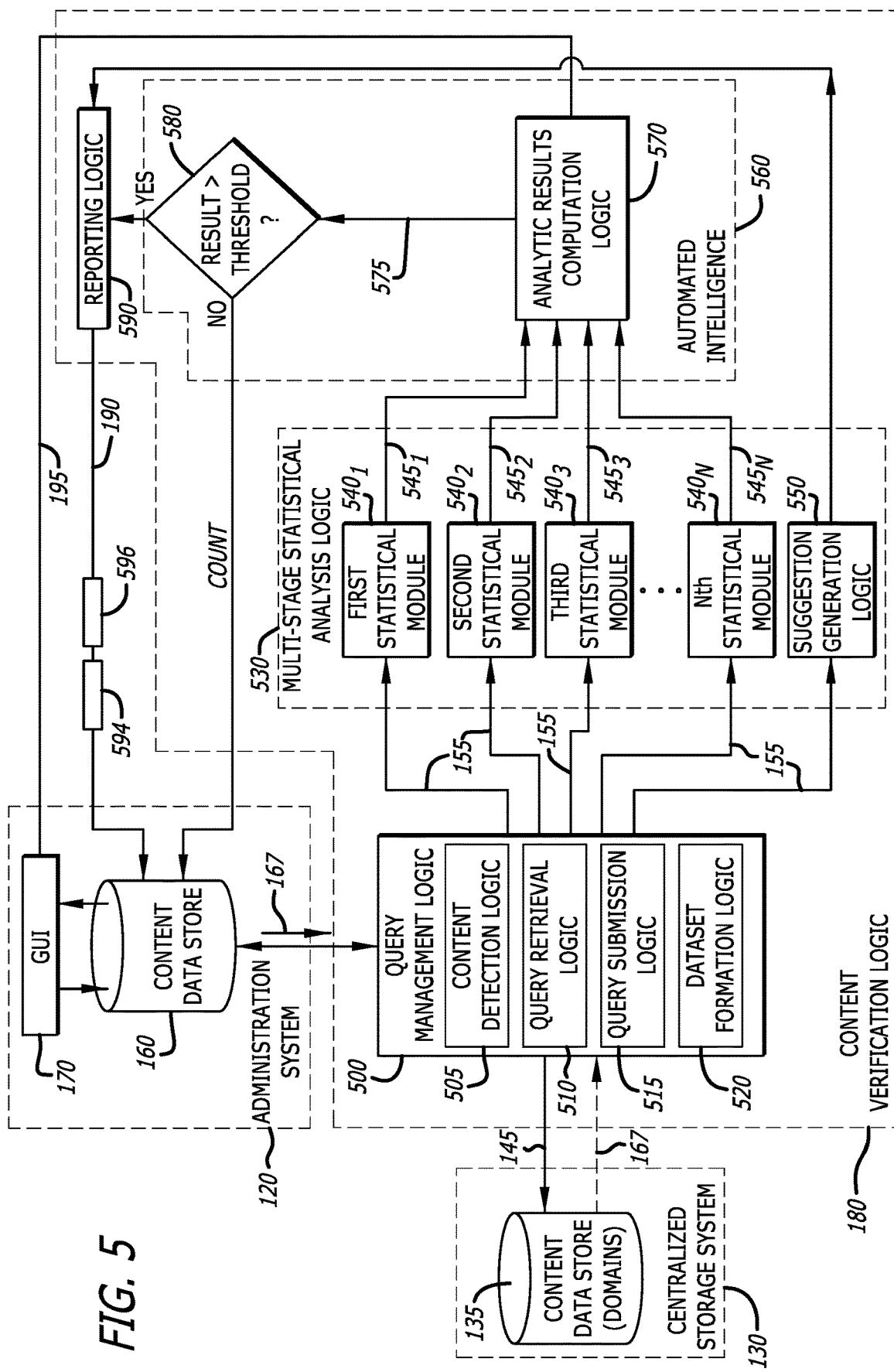
FIG. 5 is an exemplary embodiment of the data analytic system deployed of FIGS. 1 and 3-4.

Referring now to FIG. 5, an exemplary embodiment of the content verification logic 180 deployed within the data analytic system 100 of FIGS. 1-2 and 4 is shown. According to one embodiment of the disclosure, the content verification logic 180 features query management logic 500, multi-stage statistical analysis logic 530, suggestion generation logic 550, automated intelligence 560 including analytic result computation logic 570 and threshold assessment logic 580, and reporting logic 590. Herein, the query management logic 500 may be communicatively coupled to the administrative system 120 to retrieve the query 167, which is used to obtain a corresponding content 145 from the centralized storage system 130.

Herein, the query management logic 500 includes data feed detection logic 505, query retrieval logic 510, query submission logic 515 and dataset formation logic 520. More specifically, the content detection logic 505 is configured to commence operability of the query retrieval logic 510, query submission logic 515 and submission logic 520 in response to a triggering event. For example, according to one embodiment of the disclosure, the content detection logic 505 may be configured as a scheduler that polls the centralized storage system 130 according to a scheduled analysis of content within the content data store 135 (e.g., by time, number of records queued for content verification, etc.). Alternatively, the content detection logic 505 may be configured to detect a manual request for content verification. According to another embodiment of the disclosure, the content detection logic 505 may be configured as a sensor that detects a triggering event such as the queuing of a record for content verification within the data store 140. Hence, the content detection logic 505 may identify the type or types of records queued for content verification.

In response to detection of content awaiting verification, the query retrieval logic 510 is configured to recover one or more queries registered with the administrative system 120 for use in verifying the accuracy of the content 145. The query may be a general query for recovery of a specific type of content or may be customized for a registered user of the data analytic system 100. Operating as a framework to recovery of a specific content type, each query includes an identifier and a value. The "identifier" constitutes information to identify the particular type of query, which may assist in identifying one or more storage locations (e.g., particular domain server or servers, or particular storage area, etc.) from which the content 145 is to be retrieved. The "value" identifies the content to be verified. As an illustrative example, a first content type (e.g., incentives) may be uploaded by a third party source into a first domain server allocated for retention of records directed to incentives. Similarly, a second content type (e.g., vehicle equipment related content) may be provided to a second domain server. Hence, based on the particular domain server or servers chosen to maintain the content 145, the query retrieval logic 510 retrieves one or more queries (generally referred to as "query" 167) registered with the administrative system 120 for use in obtaining the content 145 therefrom.

After retrieval of the query 167, the query submission logic 515 of the query management logic 500 provides the query 167 to the centralized storage system 130 to obtain the content 145. Upon retrieval of the content 145, the submission logic 520 generates a dataset 155 for analyses, which includes the content 145 along metadata associated with that content (e.g., threshold level, weightings, query ID, context information, etc.). The submission logic 520 is further configured to coordinate processing of the dataset 155 (e.g., entire dataset 155, certain portions of the dataset 155) in accordance with multiple processing threads supported by the multi-stage statistical analysis logic 530.

According to one embodiment of the disclosure, the multi-stage statistical analysis logic 530 includes a plurality of statistical modules $540_1$-$540_N$ (N≥2). Each statistical model $540_1$ . . . or $540_N$ is directed to a different statistical analysis in accordance with natural language processing such as a first statistical (Edit Distance) module $540_1$, a second statistical (Normal Distribution; Standard Deviation) module $540_2$, a third statistical (Unigram Probability) module $540_3$, and/or a fourth statistical (Conditional Probability) module $540_4$, as described below. The statistical modules $540_1$-$540_N$ are configured to generate (statistical) results $545_1$-$545_N$, respectively.

According to one embodiment of the disclosure, the submission logic 520 may be configured to select which of the plurality of statistical modules $540_1$-$540_N$ is to receive the dataset for concurrent statistical analyses on the content to produce multiple statistical results to provide to the automated intelligence (analytic result computation logic) based on metadata associated with the dataset 155. Alternatively, according to another embodiment of the disclosure, the submission logic 520 may be configured to provide the dataset 155 to each of the plurality of statistical modules $540_1$-$540_N$ for concurrent statistical analyses, where the applicable statistical modules for the particular dataset 155 are subsequently determined by the weightings applied to the results $545_1$-$545_N$, as described below.

As an illustrative example, with respect to an incentive-related dataset (e.g., cash back, vehicle financing, etc.), statistical modules $540_1$-$540_2$ and $540_4$ (Edit Distance, Normal Distribution and Conditional Probability) may be more applicable for analyzing the dataset 155 associated with an incentive (e.g., cash back amount, percentage rate of the financing, term, etc.). Hence, the dataset 155 may include metadata that identifies the statistical modules $540_1$-$540_2$ and $540_4$ to receive at least a portion of the dataset 155. Alternatively, where the dataset 155 does not include metadata directed to selection of particular statistical modules $540_1$-$540_N$, the weighting included in the dataset 155 may be used for such selection. Similarly, with respect to accuracy of text strings being part of the dataset 155, statistical modules $540_1$ and $540_3$ (Edit Distance and Unigram Probability) may be more applicable in detecting errored content than other statistical modules.

Operating concurrently on the dataset with the statistical modules $540_1$-$540_N$, the suggestion generation logic 550 conducts a review of historical values associated with the content 145 within the dataset 155 and determines proposed value(s) for the content 145 based on the historical values. For example, where the content is directed to an incentive (e.g., cash back or financing rate), the suggestion generation logic 550 may conduct an analysis of a set of historical incentive values (e.g., a median, a mean, a mode, or other computed value based on the historical incentive values) to produce a proposal value and compare the proposed value to the current value. If the current value differs from the proposed value, the suggestion generation logic 550 provides the proposed value to the automated intelligence 560 as metadata to accompany the statistical results from the multi-stage statistical analysis logic 530 to the reporting logic 590.

According to one embodiment of the disclosure, the analytic result computation logic 570 of the automated intelligence 560 applies supplied weighting to each of the statistical results $545_1$ . . . and/or $545_N$ received from the multi-stage statistical analysis logic 530, performs weighting operations on the statistical results statistical results $545_1$ . . . and/or $545_N$ to produce weighted statistical results $565_1$ . . . and/or $565_N$, and conducts an arithmetic operation on the weighted statistical $565_1$ . . . and/or $565_N$ to produce an analytic result 575. Herein, the selected weighting between each of the statistical results $545_1$ . . . and/or $545_N$ may be based, at least in part, on the query 167 retrieved by the query management logic 500. Also, the analyst result 575 may be represented by a score or other alphanumeric value for subsequent comparison with a threshold value by the threshold assessment logic 580. The threshold value may be set as part of the dataset 155, where the value may be selected depending on risk tolerance levels for the third party source relying on the distribution of the evaluated content, where a lower threshold may reduce the frequency of false positives and increase the frequency of false negatives. It is contemplated that the threshold may be adjusted based on training data 195 provided by the administrative system 120.

Responsive to the threshold assessment logic 580 detecting that the analytic result 575 has exceeded the threshold value, which suggests the errored content, the threshold assessment logic 580 forwards the weighted statistical results $565_1$ . . . and/or $565_N$ along with context information included as part of the dataset 155, to the reporting logic 590. The reporting logic 590 is configured to generate an issue alert message 190 (hereinafter, "issue alert") made available to the graphic user interface (GUI) 170 associated with the administrative system 120. The issue alert 190 may include an inaccuracy index 592 (e.g., a value representing an analytic result such as a score), which identifies the likelihood of the content being errored content. Besides an inaccuracy index 592, the issue alert 190 may further include metadata such as query ID 594, weighted results $565_1$-$565_N$, context information 596 associated with the dataset 155 (e.g., description of content within the dataset 155, timestamp, etc.) and/or other information. At least a portion of the information included within the issue alert 190 may be rendered by the GUI 170 to produce a dashboard that allows for selective confirmation of the accuracy or inaccuracy of the issue alerts 190 may be used as training data 195 for the automated intelligence 560.

Although not shown, the reporting logic 590 may be communicatively coupled to the administrative system 120 to retrieve additional context information associated with the dataset 155 from the centralized storage system 130.

Figure 6A:
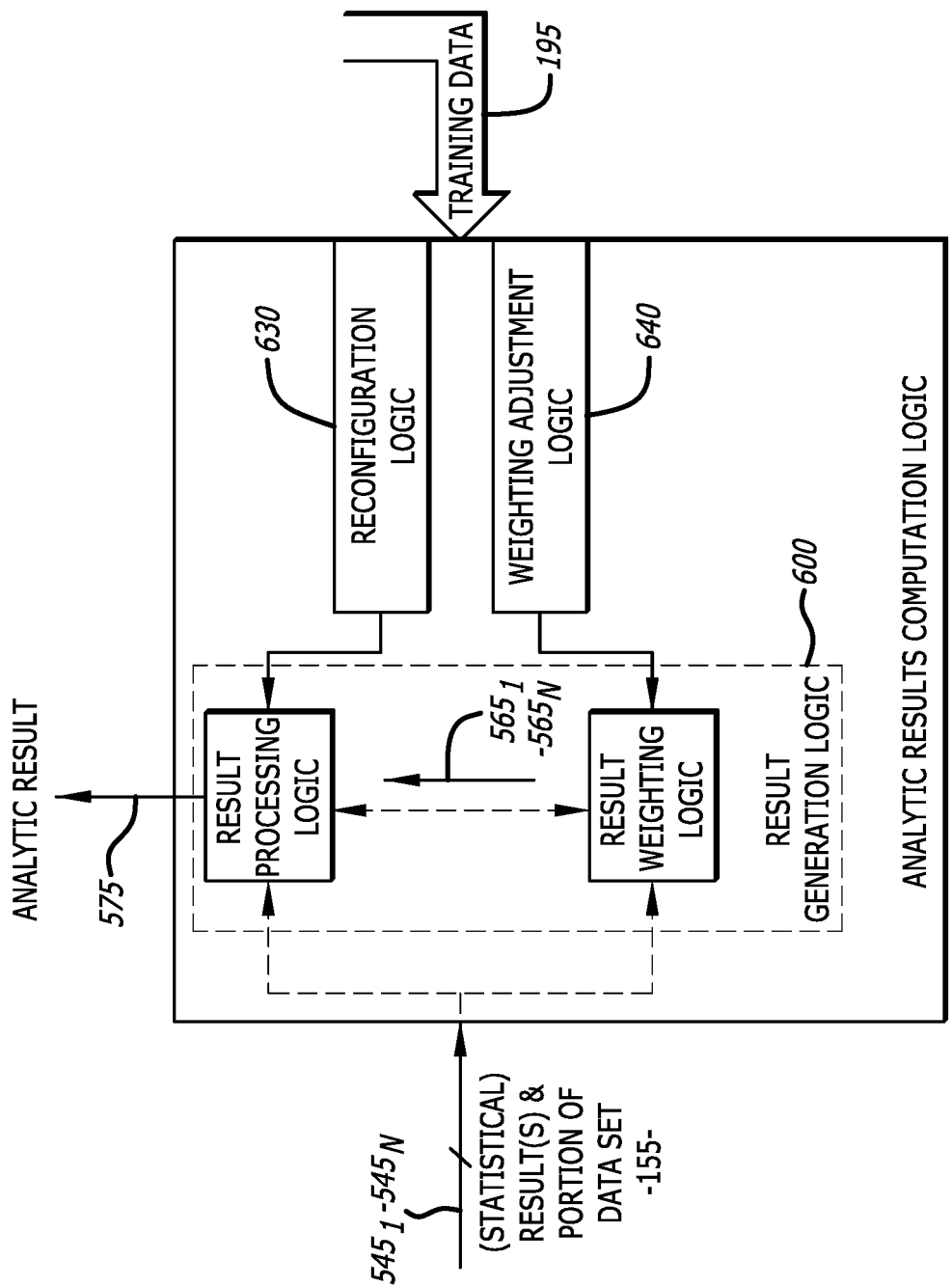
FIG. 6A is an exemplary embodiment of the analytic result computation logic of FIG. 5.

Referring now to FIG. 6A, an exemplary embodiment of the analytic result computation logic 570 of FIG. 5 is shown. As shown, the analytic result computation logic 570 features result generation logic 600, reconfiguration logic 630 and weighting adjustment logic 640. The result generation logic 600 includes result weighting logic 610 and result processing logic 620, namely logic that converts the content into the analytic result 575 that may be compared to a threshold.

Herein, the result weighting logic 610 is configured to apply weights to each of the incoming results $545_1$ . . . and/or $545_N$ from the multi-stage statistical analysis logic 530 of FIG. 5. The prescribed weighting applied to each of the incoming results $545_1$ . . . and/or $545_N$ may be based, at least in part, on the query and/or training data 195. In particular, the weighting adjustment logic 640 may receive the training data 195, which identifies correctly and/or incorrectly classified content. As a result, the weighting adjustment logic 640 may adjust a selected weighting scheme utilized by the result weighting logic 610 to place more emphasis on results from a particular statistical module (i.e., increase weighting) and/or reduce emphasis on results from another statistical module to improve accuracy of the analytic result 575.

The result processing logic 620 is configured to receive the weighted results $565_1$ . . . and/or $565_N$ and aggregate (or perform another arithmetic operation) on these weighted results $565_1$ . . . and/or $565_N$ to produce the analytic result 575. The analytic result 575 may be a value for comparison with a threshold value that is prescribed or part of the context information accompanying the dataset 155, as described above. Based on the training data 195, processing reconfiguration logic 630 may alter the arithmetic operation (e.g., order or manner of aggregation) to improve accuracy of the analytic result 575.

Figure 6B:
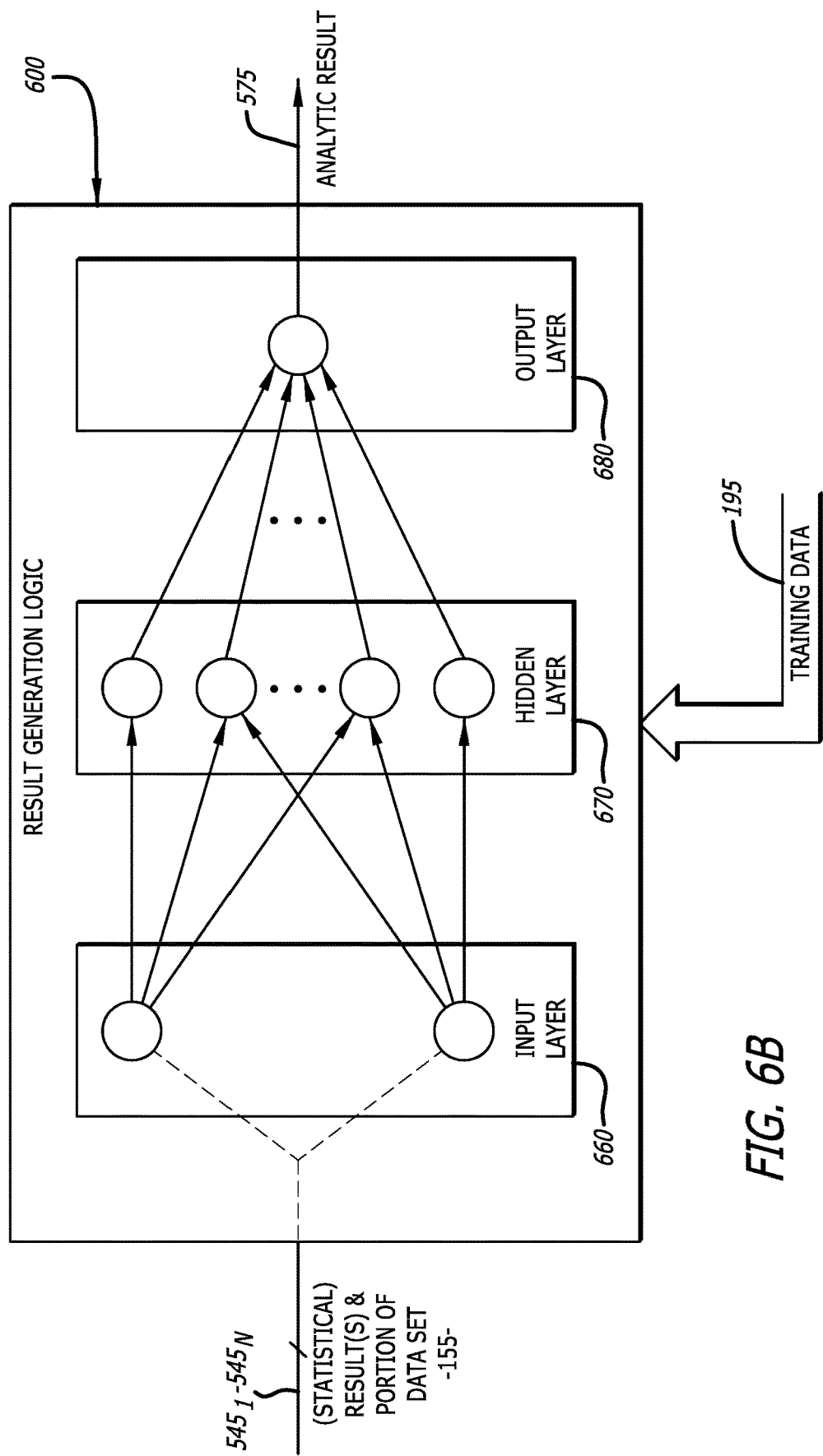
FIG. 6B is an exemplary embodiment of the result generation logic of FIG. 6A deployed as a machine learning system such as an artificial neural network.

Referring to FIG. 6B, an exemplary embodiment of the result generation logic 600 of FIG. 6A is shown. Herein, the result generation logic 600 may be deployed as an artificial neural network, which includes a layered analysis segmented into an input layer 660, an optional hidden layer 670 and an output layer 680. The weighting is conducted by nodal computing element (hereinafter, "neurons") that are used to calculate a weighted sum of inputs and weights, add bias and execute the required function to generate the analytic result 575.

Herein, as an illustrative example, the input layer 660 is configured to receive the statistical results $545_1$ . . . and/or $545_N$, perform selected computations on these results (e.g., value conversion, applying a first set of weightings, etc.) and transmit the weighted statistical results $565_1$ . . . and/or $565_N$ to the outer layer 680. According to this embodiment, the outer layer 680 may be configured to perform arithmetic operations, such as aggregation of the weighted statistical results $565_1$ . . . and/or $565_N$ for example, to generate the analytic result 575 as an output. The neural network may be reconfigured by altering functionality of selected neurons of the inner layer 660 and/or the outer layer 680 based on the training data 195 operating as feedback as to the operability of the neural network. Where the hidden layer(s) 670 are deployed, these layer(s) may perform a number of the operations to generate the analytic result 575 from the statistical results $545_1$ . . . and/or $545_N$, and the programmability of the hidden layer(s) 670 may be accomplished through the training data 595 as described above.

IV. Dashboard Layout

Referring now to FIG. 7, an exemplary embodiment of a dashboard 700 rendered by the GUI 170 of FIG. 1, 3 or 4 to notify an administrator of issue alerts is shown. Herein, the dashboard 700 features a displayable window 710 with selectable objects 720. These selectable objects 720 may include, but are not restricted or limited to a status object 730, an issue count object 740, an issue summary object 750, a domain scorecard 760, a domain issue segregation object 770 and one or more issue alert objects 780. Each of these objects, when selected, may provide additional objects that provide additional granularity as to the subject matter conveyed by the object.

The status object 730 identifies the status of any issue alerts determined by the data analytic system. As an illustrative example, the status may be represented by a relationship between (i) the number of issue alerts that have been verified 732 (e.g., confirmed or determined to be erroneous and ignored) and (ii) a number of issue alerts that remain open 734. This ratio between the "verified" issue alerts and the "open" issue alerts identifies the degree of confirmation backlog that may assist in resource allocation.

The issue count object 740 provides a historical reference of the issue alert generation over a prescribed period of time. The issue count object 740 may be used to identify data inaccuracy trends (e.g., particular days, time of time, etc.) as to a greater or lesser presence of unreliable (errored) content in efforts to improve accuracy of the content.

The issue summary object 750 provides information as to particular parameters associated with the issue alert. For example, the issue summary object 750 may include a first parameter 752 directed to the average analytic result (score) of "open" issue alerts. Similarly, a second parameter 754 may be directed to the average analytic result (score) of "verified" issue alerts while a third parameter 756 may be directed to the average analytic result (score) of ignored (non-issue) content being verified.

The domain scorecard 760 provides information (e.g., grade A-F) of the reliability (accuracy) of the issue alert from different third party sources. An "A" grade represents a highest level of reliability in the data (content) provided by the third party source (e.g., less than a prescribed percentage of false positives and/or false negatives. Additionally, the domain issue segregation object 770 provides information that identifies the domain servers from which issue alerts are provided, which may be used to identify subject matter and third party sources who are more prone to release errored content.

The one or more issue alert objects 780 identify content that is initially suspected as being unreliable (errored content). Each issue alert object 780 includes a graphical depiction 782 of the weighted statistical results based on results computed by the multi-stage statistical analysis logic. Each issue alert object 780 may further include (i) context information 784 that accompanied the dataset during processing and may be used to better identify the nature of the dataset to which the issue alert has been signed; (ii) a suggestion 786 that includes a proposed suggestion for content determined to in error; and (iii) a timestamp 788. The suggestion 786 is generated by the suggestion generation logic 550 of FIG. 5. Each issue alert may be manually confirmed or automatically confirmed by logic operating within the data analytics system 100 of FIG. 1-2 or 4.

V. Method of Operation

Figure 8A:
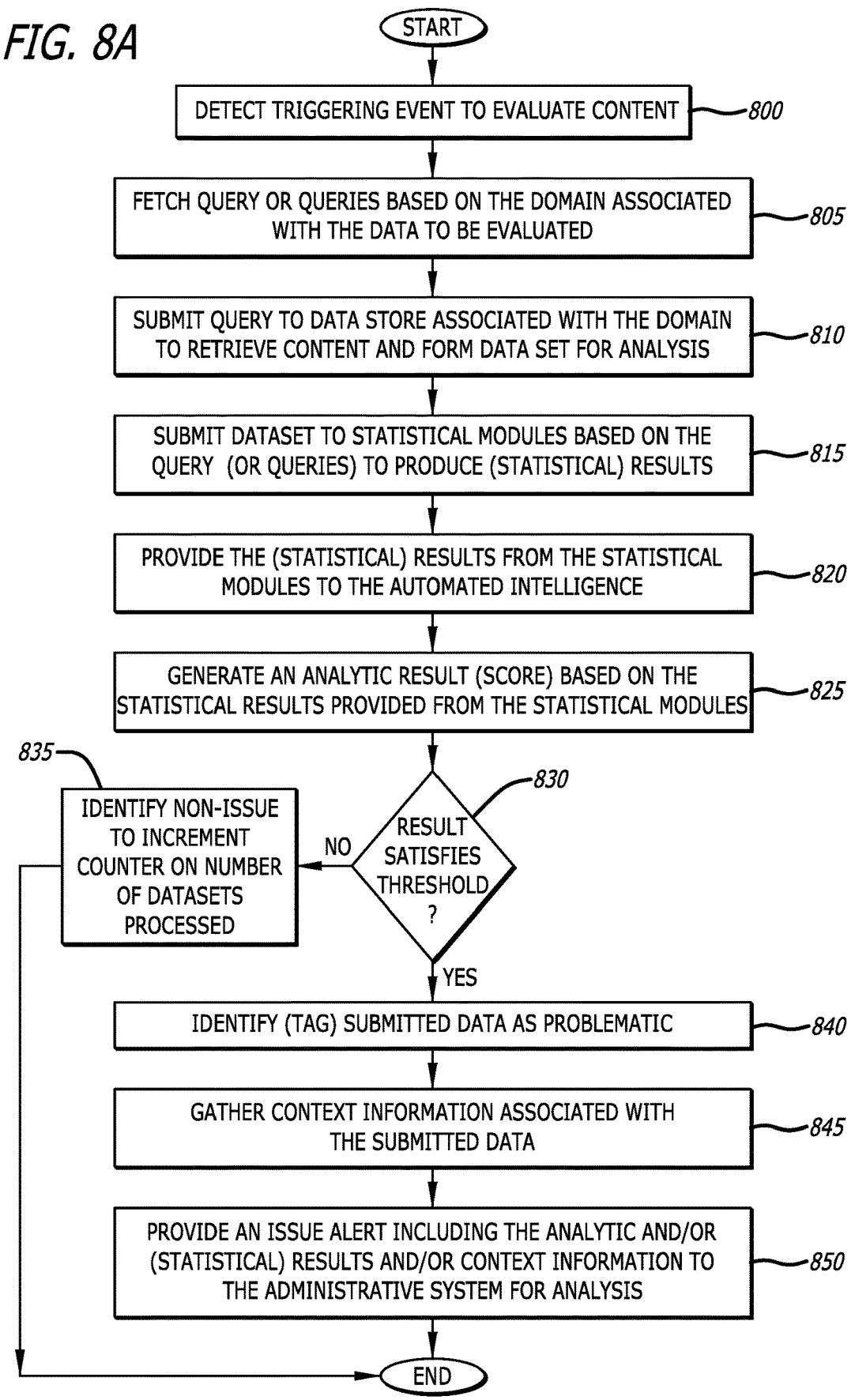
FIG. 8A is an exemplary flowchart of the operations of the content verification logic deployed within the data analytic system of FIG. 1 and FIGS. 3-4.

Referring now to FIG. 8A, an exemplary flowchart of the operations of the content verification logic deployed with the data analysis system 100 of FIGS. 1-2 or FIG. 4 is shown. Herein, a triggering event is detected to evaluate content for accuracy (block 800). A query is fetched based on the type of content to be evaluated (block 805). Upon fetching the query, the query is submitted to the data store to receive content for analysis and formulate a dataset for analysis (block 810). The dataset includes the content along with context information and information directed to support the analytics performed on the content.

The dataset is submitted to multiple (two or more) analysis modules, where the particular analysis modules are selected based on the type of query. Each of the analysis modules perform a different statistical operation on the content and produce statistical results that may be used to determine a presence of certain errors within the content (block 820). From these statistical results, after appropriate weighting is applied, an analytic result is produced (operation 825). Where the analytic result fails to satisfy a threshold, indicating that the content does not feature sufficient errors to warrant withholding from dissemination, a counter at the administrative system is incremented to identify that a dataset was processed (operations 830 and 835). Where the analytic result satisfies the threshold, the issue alert is generated in which the query ID is identified, context information associated with the submitted content is gathered and provided to the administrative system for further confirmation, as desired (operations 830 and 840-850).

Figure 8B:
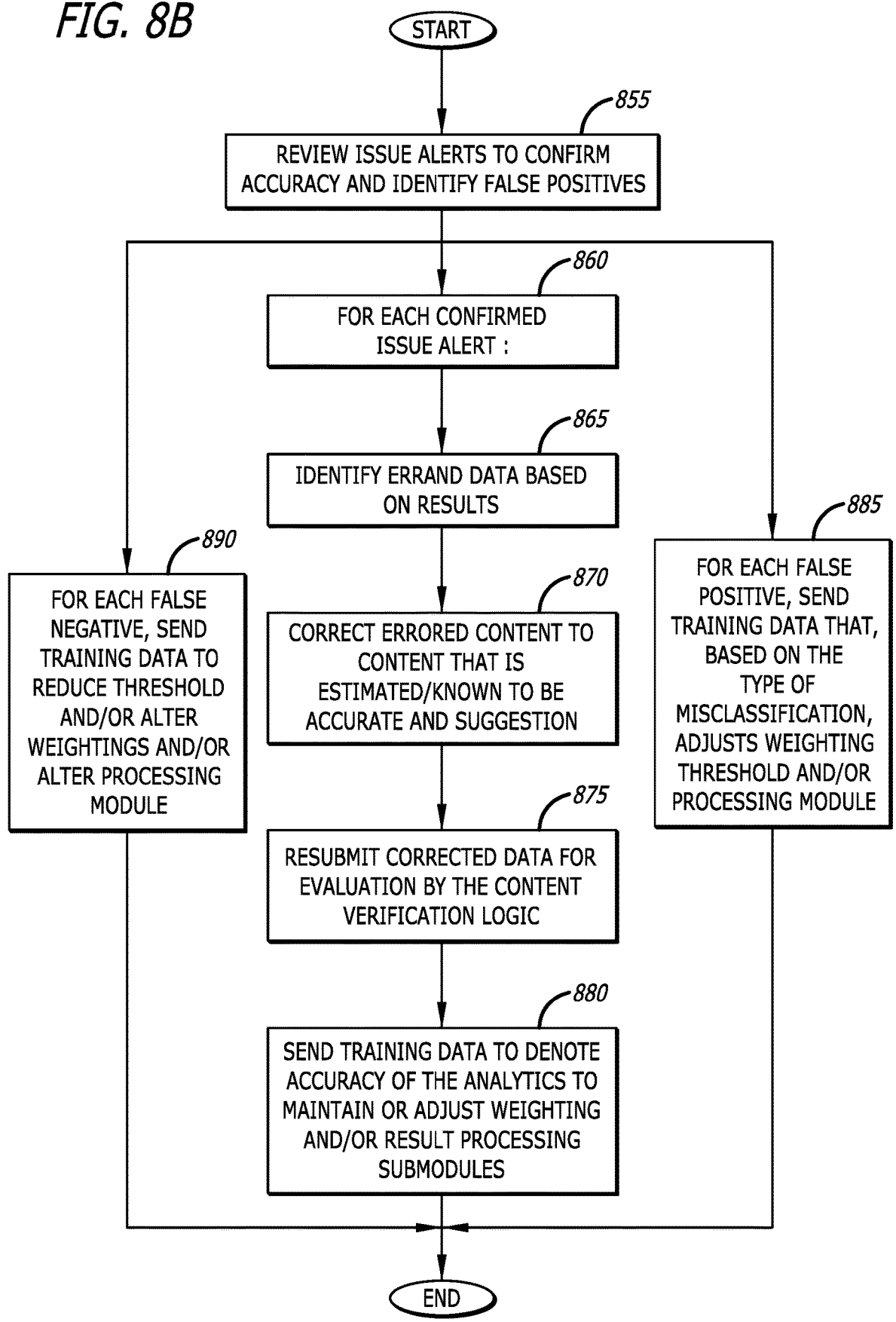
FIG. 8B is an exemplary flowchart directed to operability of the administrative control system and issuance of training data to the analytic result computation logic of FIG. 5.

Referring to FIG. 8B, an exemplary flowchart directed to operability of the administrative system and issuance of training data to the analytic result computation logic of FIG. 5 is shown. Herein, the information included in the issue alerts is accessed and rendered upon which the accuracy of the issue alerts may be reviewed (operation 855). For each confirmed issue alert based on a comparison with content known to be correct, the errand content is corrected and resubmitted for re-evaluation by the content verification logic (operations 860-875). Although not shown, the corrected content may be compared against the suggestion provided by the suggestion generation logic, where any differences between these compared values may be provided to the suggestion generation logic as training data. Additionally, training data to alter the operability of automated intelligence to avoid recurrence of the false positive is sent to adjust analytics conducted by the automated intelligence (operation 880).

As further shown in FIG. 8B, for each false positive (errored content when accurate content), the administrative system provides training data that, based on the misclassification, adjusts one or more weightings, increases the threshold and/or alters the processing module (operation 885). Similarly, for each false positive (errored content when accurate content), the administrative system provides training data that, based on the misclassification, adjusts one or more weightings, decreases the threshold and/or alters the processing module (operation 890).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system for conducting automated analytics of content within a network-based system, comprising:
   a processor; and
   a memory communicatively coupled to the processor and configured to store
      query management logic that, responsive to a triggering event, initiates one or more queries, each query of the one or more queries is directed for retrieval of particular type of content to be verified,
      multi-stage statistical analysis logic to concurrently (i) conduct a plurality of statistical analyses on the content included as part of a dataset provided to the multi-stage statistical analysis logic and (ii) generate a corresponding plurality of statistical results associated with determined accuracy of the content, the plurality of statistical analyses are directed to different types of natural language processing analytics;

automated intelligence configured to (i) receive the plurality of statistical results, (ii) apply weightings to each of the statistical results based, at least in part, on a type of query associated with the dataset, (iii) perform an arithmetic operation on the weighted statistical results to produce an analytic result, and (iv) determine whether the analytic result signifies that the content constitutes errored content; and reporting logic communicatively coupled to the automated intelligence, the reporting logic being configured to receive at least the analytic result and metadata associated with the content included as part of the dataset and generate one or more issue alert messages including information for rendering a dashboard representing the analyses conducted by the multi-stage statistical analysis logic and the automated intelligence.

2. The system of claim 1, wherein the metadata includes a textual description of the content.

3. The system of claim 1, wherein the plurality of statistical analyses are conducted by execution, by the processor, of at least two of (1) a first statistical module conducting an Edit Distance analysis, (2) a second statistical module conducting a Normal Distribution analysis, (3) a third statistical module conducting an Unigram Probability analysis and (4) a fourth statistical module conducting a Conditional Probability analysis.

4. The system of claim 3, wherein the plurality of statistical analyses conducted concurrently in verification of the particular type of content being an incentive-based content include the first statistical module conducting the Edit Distance analysis, the second statistical module conducting the Normal Distribution analysis, and the fourth statistical module conducting the Conditional Probability analysis.

5. The system of claim 3, wherein the plurality of statistical analyses conducted concurrently in verification of the particular type of content with respect to accuracy of textual information of the content include the first statistical module conducting the Edit Distance analysis and the third statistical module conducting the Unigram Probability analysis.

6. The system of claim 1, wherein the query management logic provides the dataset to the multi-stage statistical analysis logic, the dataset includes a collection of information received from an administrative system including the content and the metadata associated with the content including context information.

7. The system of claim 1, wherein the automated intelligence being configured to receive training data, being data based on correct or incorrect determinations of verified content is in error, and adjust the weightings applied to each of the statistical results produced by the plurality of statistical analyses.

8. The system of claim 1 further comprising:
a data analytic system communicatively coupled to the reporting logic to aggregate content associated with one or more analytics results, including the analytic result, to generate the alert messages to be rendered as part of the dashboard to visually illustrate a presence of any potential errored content under verification within a data feed including the content.

9. The system of claim 1, wherein the query management logic is configured to retrieve the one or more queries, where the one or more queries are selected based on the particular type of content to be verified and each query provides a framework for data associated with the content and the metadata to be retrieved from one or more domain servers deployed within a centralized storage system.

10. A system comprising:
an administrative system including a non-transitory storage medium including a plurality of queries, each query provides a framework for data to be retrieved from one or more servers; and a data analytic system communicatively coupled to the administrative system, the data analytic system includes
query management logic configured to retrieve one or more queries of the plurality of queries from the administrative system, each query of the one or more queries is directed for retrieval of particular type of content to be verified,
multi-stage statistical analysis logic configured to (i) concurrently conduct a plurality of statistical analyses on the content included as part of a dataset provided to the multi-stage statistical analysis logic from the query management logic and (ii) generate a corresponding plurality of statistical results associated with determined accuracy of the content, the plurality of statistical analyses are directed to different types of natural language processing analytics,
automated intelligence configured to (i) receive the plurality of statistical results, (ii) apply weightings to each of the statistical results based, at least in part, on a type of query associated with the dataset, (iii) perform an arithmetic operation on the weighted statistical results to produce an analytic result, and (iv) determine whether the analytic result signifies that the content constitutes errored content, and
reporting logic communicatively coupled to the automated intelligence, the reporting logic being configured to receive at least the analytic result and metadata associated with the content included as part of the dataset and generate one or more issue alert messages including information for rendering a dashboard representing the analyses conducted by the multi-stage statistical analysis logic and the automated intelligence.

11. The system of claim 10, wherein the data analytic system operates as a cloud service.

\* \* \* \* \*